(12) United States Patent
George, Sr. et al.

(10) Patent No.: US 11,366,457 B1
(45) Date of Patent: Jun. 21, 2022

(54) CONTROLING OPERATION OF MACHINE TOOLS USING ARTIFICIAL INTELLIGENCE

(71) Applicant: ON-TIME.AI, INC., Dallas, TX (US)

(72) Inventors: Michael L. George, Sr., Dallas, TX (US); Michael George, Jr., Dallas, TX (US)

(73) Assignee: On-Time.AI, Inc., Dallas, TX (US)

( * ) Notice: Subject to any disclaimer, the term of this patent is extended or adjusted under 35 U.S.C. 154(b) by 155 days.

(21) Appl. No.: 16/824,363

(22) Filed: Mar. 19, 2020

Related U.S. Application Data

(63) Continuation of application No. 16/686,529, filed on Nov. 18, 2019, now abandoned.

(60) Provisional application No. 62/768,267, filed on Nov. 16, 2018.

(51) Int. Cl.
  *G05B 13/02* (2006.01)
  *G05B 19/418* (2006.01)
  *G06N 3/08* (2006.01)

(52) U.S. Cl.
  CPC ....... *G05B 19/4188* (2013.01); *G05B 13/027* (2013.01); *G05B 19/41825* (2013.01); *G05B 19/41885* (2013.01); *G06N 3/08* (2013.01)

(58) Field of Classification Search
  CPC .............. G05B 19/4188; G05B 13/027; G05B 19/41825; G05B 19/41885; G06N 3/08
  USPC ......................................................... 700/95
  See application file for complete search history.

(56) References Cited

U.S. PATENT DOCUMENTS

| | | | |
|---|---|---|---|
| 3,845,286 A | 10/1974 | Aronstein et al. |
| 3,891,836 A | 6/1975 | Lee |
| 4,058,711 A | 11/1977 | Ondercin et al. |
| 4,628,434 A | 12/1986 | Tashiro et al. |

(Continued)

FOREIGN PATENT DOCUMENTS

| JP | H05-204891 | * | 8/1993 |
|---|---|---|---|
| SU | 930320 | | 5/1982 |

OTHER PUBLICATIONS

Zhang et al., "Fuzzy neural network-based rescheduling decision mechanism for semiconductor manufacturing", 2014, Elsevier, p. 1115-1125. (Year: 2014).*

(Continued)

*Primary Examiner* — Hien D Khuu
(74) *Attorney, Agent, or Firm* — Fish & Richardson P.C.

(57) ABSTRACT

Methods, systems and apparatus, including computer programs encoded on computer storage medium, for controlling operations of machine tool workstations. Machine tool workstations are grouped into functional groups. Neural networks corresponding to the functional groups are trained to process respective inputs representing parts to be processed to generate respective outputs representing sequences of ordered subsets of the parts that produce a reduced setup time for workstations in the functional groups. Data representing respective collections of parts to be processed by workstations included in the functional groups is processed using the trained neural networks to generate corresponding sequences of ordered subsets of the collection of parts. Average delay times associated with the generated sequences of ordered subsets of the collection of parts are computed. If the average delay times are less than a predetermined threshold, parts are released to the functional groups for processing according to the generated sequences.

17 Claims, 8 Drawing Sheets

(56) References Cited

U.S. PATENT DOCUMENTS

| | | | |
|---|---|---|---|
| 4,644,480 A | 2/1987 | Haruna et al. | |
| 4,729,105 A | 3/1988 | Thompson et al. | |
| 4,796,194 A | 1/1989 | Atherton | |
| 4,802,094 A | 1/1989 | Nakamura et al. | |
| 4,896,269 A | 1/1990 | Tong | |
| 4,975,827 A | 12/1990 | Yonezawa | |
| 5,195,041 A | 3/1993 | George et al. | |
| 5,216,593 A | 6/1993 | Dietrich et al. | |
| 5,231,567 A | 7/1993 | Matoba et al. | |
| 5,280,425 A | 1/1994 | Hogge | |
| 5,351,195 A | 9/1994 | Sherman | |
| 5,495,430 A * | 2/1996 | Matsunari | G05B 19/41865 706/904 |
| 5,819,232 A | 10/1998 | Shipman | |
| 5,838,568 A | 11/1998 | Dickinson et al. | |
| 6,038,540 A | 3/2000 | Krist et al. | |
| 6,633,791 B1 | 10/2003 | Lo et al. | |
| 6,725,183 B1 | 4/2004 | Cawse | |
| 6,993,492 B2 | 1/2006 | George et al. | |
| 7,127,310 B1 * | 10/2006 | Barto | G05B 19/41865 700/121 |
| 7,415,421 B2 | 8/2008 | Tu et al. | |
| 7,489,990 B2 | 2/2009 | Fehr et al. | |
| 7,657,451 B2 | 2/2010 | Dubois et al. | |
| 8,069,122 B2 | 11/2011 | George | |
| 8,229,691 B2 | 7/2012 | Behm et al. | |
| 10,054,929 B1 * | 8/2018 | George | G05B 19/41835 |
| 2002/0026257 A1 | 2/2002 | Newmark | |
| 2002/0198629 A1 | 12/2002 | Ellis | |
| 2003/0014225 A1 | 1/2003 | De Vicente | |
| 2003/0033040 A1 | 2/2003 | Billings | |
| 2003/0216819 A1 | 11/2003 | Yasuda | |
| 2004/0158338 A1 | 8/2004 | Mammoser et al. | |
| 2004/0181498 A1 | 9/2004 | Kothare et al. | |
| 2004/0260592 A1 | 12/2004 | George et al. | |
| 2005/0154625 A1 | 7/2005 | Chua et al. | |
| 2005/0177260 A1 | 8/2005 | Schweizerhof et al. | |
| 2005/0209941 A1 | 9/2005 | Hsu et al. | |
| 2005/0222867 A1 | 10/2005 | Underwood et al. | |
| 2005/0273305 A1 | 12/2005 | Thalhammer-Reyero | |
| 2006/0031048 A1 | 2/2006 | Gilpin et al. | |
| 2006/0100890 A1 | 5/2006 | Macy et al. | |
| 2006/0136282 A1 | 6/2006 | Furin et al. | |
| 2006/0136461 A1 | 6/2006 | Lee et al. | |
| 2006/0242005 A1 | 10/2006 | Rodrigue et al. | |
| 2006/0259163 A1 | 11/2006 | Hsiung et al. | |
| 2007/0100486 A1 | 5/2007 | Burda et al. | |
| 2007/0116215 A1 | 5/2007 | George et al. | |
| 2008/0015871 A1 | 1/2008 | Eder | |
| 2008/0235067 A1 | 9/2008 | George | |
| 2009/0099887 A1 | 4/2009 | Sklar et al. | |
| 2009/0157569 A1 | 6/2009 | Henby et al. | |
| 2010/0003645 A1 | 1/2010 | Hathaway | |
| 2010/0049592 A1 | 2/2010 | Aldennan et al. | |
| 2010/0191581 A1 | 7/2010 | Furin et al. | |
| 2010/0249974 A1 | 9/2010 | Fei et al. | |
| 2011/0213715 A1 | 9/2011 | George et al. | |
| 2011/0246257 A1 | 10/2011 | Meade | |
| 2012/0123583 A1 | 5/2012 | Hazen et al. | |
| 2015/0347949 A1 | 12/2015 | Dwyer et al. | |
| 2019/0278878 A1 * | 9/2019 | Sawyer | G06F 21/602 |

OTHER PUBLICATIONS

U.S. Appl. No. 60/438,906, filed Jan. 9, 2003, Rodrigue et al.
"Control chart", retrieved from https://en.wikipedia.org/wiki/Control_chart on Apr. 25, 2016.
A.M. Tsirlin, Vladimir Kaskov and N.A. Kolinko Program System Institute, Russion Academy of Science; Jun. 16. 2003; tsirlin@sarc.botik.ru; Vladimir.Kaszakov@uts.edu.au; Titled: A minimal dissipation type based classification in irrevisible thermodynamics and microeconomics; 16 pages.
AC 2007-711; Instructional Strategies And Tools To Teach Six Sigma To Engineering Techologv Undergraduate Students [PDF] from usm.eduS Furterer—2007—ice.usm.edu.
Anupindi, Ravi, et al., Managing Business Process Flows, Principles of Operations Management, © 2006, 1999. Pearson Education, Inc. Upper Saddle River, NJ, p. 50.
Application of DMAIC to integrate Lean Manufacturing and Six Sigma [PDF] from vt.edu P Stephen—2004—scholar, lib.vt.edu.
Bao, Han P., Samarch, J. A.. "Affordable Design: A methodology to implement process-based manufacturing cost models into the traditional performance-focused multidisciplinary design optimization," American Institute of Aeronautics and Astronautics, pp. 1-7.
Campolongo, et al. "An effective screening design for sensitivity analysis of large models" Environmental Modelling & Software 22 (2007) pp. 1509-1518.
Caramanis, Michael C., Anli, Osman M., "Dynamic Lead Time Modeling for JIT Production Planning," Proceedings of the 1999 IEEE International Conference on Robotics 7 Automation, Detroit Michigan 1999, pp. 1450-1455.
Caramanis, Michael C., Pan, Haidong, Anli, Osman M., A Closed-Loop Approach to Efficient and Stable Supply-Chain Coordination in Complex Stochastic Manufacturing Systems Proceedings of the American Control Conference, Arlington VA 2001, pp. 1381-1388.
Chase, Richard Bl., et al., Production and Operations Management, Manufacturing and Services, Eighth Edition, © 1998, pp. 590-591, Irwin McGraw-Hill, United States of America.
Darlington, Jon, "Lean thinking and mass customization: The relationship between product and costs," Management Accounting, vol. 77, No. 10, Nov. 1999, pp. 18-21.
Dobson, G., et al. "Batching to Minimize Flow times on One Machine", Management Science. Jun. 1987, vol. 33, No. 6, pp. 784-799.
E.W. Piotrowski and J. Sladkowski; Titled: The Thermodynamics of Portfolios: Institute of Theoretical Physics, University of Bialystok; ep@alpha.uwb.edu.pl; sladk@us.edu.pl; 8 pages.
Hermann, Jeffrey W., Chincholkar, Mandar M., "Reducing Throughput Time during Product Design Institute for Systems Research," University of Maryland, Aug. 13. 2001, pp. 1-25.
Hermann, Jeffrey, Chincholkar, Mandar M., "Design For Production: A tool for reducing manufacturing cycle time," Proceedings of DETC 2000, 2000 ASME Design Engineering Technical Conference, Baltimore Maryland, pp. 1-10.
Hines, Peter, Rich, Nick, "The seven value stream mapping tools," International Journal of Operations & Production Management, vol. 17, Issue 1, Nov. 19979.
Hoehn, William K., "Robust Designs Through Design to Six Sigma Manufacturability," 1995 Engineering Management Conference, IEEE 1995, pp. 241-246.
How to scope DMAIC projects [PDF] from topcities.com DP Lynch, S Bertolino . . .—quality Progress, 2003-jpm2002.topcities.com.
John Bryant; Titled: A Thermodynamic Theorv of Economics; Final Post Review Version; john.bryant@vocat.co.uk; 31 pages.
Kochan, A., "Hocus Takes the Risk Our of Planning FMS", FMS Magazine, pp. 91-93, Apr. 1984.
Lean and Six Sigma—a one-two punch [PDF] from tbmcg.com B Smith—quality progress, 2003—tbmcg.com.
Lee, Hau L., Tang, Christopher S., "Modeling the Costs and Benefits of Delayed Product Differentiation," Management Science, vol. 43, Issue 1, Jan. 1997, pp. 40-53.
Liberopoulos, et al. "Performance Evaluation of an Automatic Transfer Line with WIP Scrapping During Long Failures" (2006) pp. 1-22.
Michael, George, "Lean Six Sigma: Combining Six Sigma Quality with Lean Speed," McGraw-Hill, Apr. 2002, ISBN: 0071385215.
Morris, "Factorial sampling plans for preliminary computational experiments" Technometrics, vol. 33, No. 2 May 1991.
Nahmias, Steven, Production and Operations Analysis, © 2005, 2 pp., McGraw-Hill Irwin, NY, NY. 5th Edition, pp. 202-203.
Naylor et al., "The Manufacturing Game: A Formal Approach to Manufacturing Software," IEEE Transactions on Systems, Man and Cybernetics, pp. 321-334 (May/Jun. 1986).

(56) References Cited

OTHER PUBLICATIONS

Poole, T.G., and Szymankiewicz, J.Z., eds., Using Simulation to Solve Problems, Chapter 5, Building a Formal Model, pp. 75-112, 1977, McGraw-Hill book Company (UK) Limited.

Queueing Networks and Markov Chains: Modeling and Performance Evaluation with Computer Science Applications, Bolch, Greiner, de Meer, and Trivedi, eds., John Wiley & Sons, Inc. 1988, pp. 209, 212-215, 223-225, 265-273, 283-288, 430-438, 630-641.

Raisinghani, "Six Sigma: concepts, tools, and applications" Industrial Management & Data Systems vol. 105, No. 4, (2005) p. 491-505.

Roundy, Robin, "98% Effective Integer-Ratio Lot-Sizing for One-Warehouse Multi-Retailer Systems," Management Science, Nov. 1985, pp. 1416-1430, vol. 31, No. 11, U.S.A.

Roundy, Robin, "A 98% Effective Lot-Sizing Rule for a Multi-Product, Multi-Stage Production/Inventory Sys," Mathematics of Operations Research, Nov. 1986, pp. 699-727, vol. 11, No. 4. The Institute of Management Sciences/Operations Research Society of America, U.S.A.

Rummel, Jeffrey, "An empirical investigation of costs in batching decisions," Decision Sciences, vol. 31, No. 1, Winter 2000, pp. 79-103.

Six Sigma black belts: what do they need to know? [PDF] from psu.eduRW Hoerl—Hournal of Quality Technology, 2001—Citeseer.

Thermodynamic analogies in economics and finance: instability of markets (McCauley) Published in: Physica A 329 (2003).

When worlds collide: lean and Six SigmaRD Snee—Quality Progress, 2005—mall.asq.org.

Womack, et al. "The Machine That Changed the World" (1991) pp. 138-168 and 192-222.

Yang, Jiaqin, Deane, Richard H., "A lotsize reduction model for just-in-time manufacturing systems," Integrated Manufacturing Systems, 2002, vol. 13, Issue 7, pp. 471-488.

Blazewicz, et al., "The job shop scheduling problem: Conventional and new solution techniques," Eur. J. Operational Res., 1996, 93:1-33.

Graham, et al., "Optimization and approximation in deterministic sequencing and scheduling: a survey," Annals of Discrete Mathematics, 1979, 5:287-326.

Liker, "Benefits of One-Piece Flow," The Toyota Way, McGraw-Hill, 2004, 3 pages.

Nielsen, "Neural Networks and Deep Learning," Determination Press, 2015.

\* cited by examiner

CONTROLING OPERATION OF MACHINE TOOLS USING ARTIFICIAL INTELLIGENCE

CROSS-REFERENCE TO RELATED APPLICATIONS

This application is a continuation of U.S. application Ser. No. 16/686,529, filed Nov. 18, 2019, now pending, which claims the benefit of U.S. Provisional Application Ser. No. 62/768,267, filed Nov. 16, 2018 both of which are incorporated by reference.

TECHNICAL FIELD

This specification generally relates to controlling operations of machine tool workstations.

BACKGROUND

Machine shops contain raw materials, such as bar stock for machining, which are processed by machine tools to create an inventory of finished parts that may be provided for use in the machining industry, semiconductor industry, automotive industry, aerospace and defense industry or others. Finished parts are work pieces that meet specifications set out for the work piece by engineering drawings, blue prints, or digital information.

Machines tools in a machine shop are used for shaping or machining metals or other materials to manufacture a variety of different finished parts. Manufacturing different parts in a machine shop typically requires multiple change overs or setup processes of the machine tools to change part types. Each setup process is then followed by cutting, boring, grinding, shearing or other methods of deformation. For example, in semiconductor manufacturing changes in part types can require repeatedly setting up a machine tool to perform different processes such as photolithography, wet etching, or dry etching. As another example, in the printing industry changing wallpaper types can require changing out a large rotogravure cylinder and ink color matching.

Most manufacturing industries are adversely affected by setup time. Setup time is generally considered waste time. The longer the setup time, the larger the batch size of subsequent production is required to make the process profitable. This in turn can create substantial finished goods inventory which may never be sold. In addition, the number of different products needed to compete in most markets is growing rapidly, in many industries by nearly 20% per annum, which reduces required repetition frequency per product. This in turn causes engineering-intensive methods for reducing setup time to become ineffective.

SUMMARY

This specification describes methods and systems for controlling operations of machine tool workstations using artificial intelligence to reduce a total setup cost of a manufacturing process whilst maintaining target delivery time.

Innovative aspects of the subject matter described in this specification may be embodied in methods for processing a plurality of parts using a plurality of machine tool workstations, the methods including grouping the plurality of machine tool workstations into multiple functional groups, wherein each functional group includes workstations of the same type; for each of the multiple functional groups: training a neural network to process a data input representing multiple parts to be processed by the type of workstations included in the functional group and generate a data output representing a sequence of ordered subsets of the multiple parts that, when processed by the functional group, produces a reduced set up time for the workstations in the functional group; processing, through the trained neural network, data representing a collection of the plurality of parts, the collection of the plurality of parts comprising parts to be processed by the type of workstations included in the functional group, to generate a corresponding sequence of ordered subsets of the collection of parts that, when processed by the functional group, produces a reduced set up time for the workstations in the functional group; computing an average delay time associated with the generated sequence of ordered subsets of the collection of parts; determining whether the average delay time is less than a predetermined threshold; and in response to determining that the average delay time is less than the predetermined threshold, releasing parts according to the generated sequence of ordered subsets of the collection of parts to the functional group for processing.

Other embodiments of this aspect include corresponding computer systems, apparatus, and computer programs recorded on one or more computer storage devices, each configured to perform the actions of the methods. A system including a collection of machine tool workstations used to process a plurality of parts; one or more computers in data communication with the collection of machine tool workstations; and a computer-readable medium coupled to one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the machine tool workstations comprise one or more of (i) cutting tools, (ii) drilling machines, (iii) lathes, (iv) boring machines, or (v) grinding machines.

In some implementations each workstation is associated with a set of performance parameters, the set comprising workstation setup time and part delivery time.

In some implementations workstations of a same type comprise workstations with a common Kanban inventory.

In some implementations each functional group is configured to receive a constrained number of days of work in progress per batch of parts, wherein the number of days depends on an average setup and machining time per part over each workstation in the functional group.

In some implementations the number of multiple functional groups is dependent on the computational capabilities of the neural networks and properties of the plurality of machine tool workstations.

In some implementations properties of the machine tool workstations comprise one or more of (i) location of machine tool workstation, (ii) an acceptable uninterrupted machine tool workstation runtime.

In some implementations training the neural network comprises training the neural network on a plurality of training data sets, each training data set comprising a data input representing multiple parts to be processed by the type of workstations included in the functional group and a corresponding sequence of ordered subsets of the multiple parts that, when processed by the functional group, produces a reduced set up time for the workstations in the functional group, wherein the corresponding sequence of ordered subsets of the multiple parts has been determined using a branch and bound method.

In some implementations training the neural network on a plurality of training data sets comprises, for each training data set: processing the data input representing multiple parts in accordance with current values of parameters of the neural network to generate a predicted sequence of ordered subsets of the multiple parts; and adjusting the current values of the parameters of the neural network based on the predicted sequence of ordered subsets of the multiple parts and the sequence of ordered subsets of the multiple parts determined using the branch and bound method.

In some implementations the neural network is implemented by cloud computing.

In some implementations the size of the ordered subsets is dependent on acceptable uninterrupted machine tool workstation runtimes.

In some implementations releasing parts according to the generated sequence of ordered subsets of the collection of parts to the functional group for processing generates processed parts, and wherein the method further comprises routing one or more subsets of the processed parts to other functional groups for further processing.

In some implementations determining the average delay time comprises applying Little's Law.

In some implementations determining whether the average delay time is less than a predetermined threshold comprises: computing a standard deviation of delay time; adding a multiple of the computed standard deviation to the computed average delay time to generate an adjusted average delay time; and determining whether the adjusted average delay time is less than the predetermined threshold.

In some implementations the method further comprises in response to determining that the average delay time exceeds the predetermined threshold: iteratively reducing the size of the ordered subsets in the generated sequence of ordered subsets until the average delay time is less than the predetermined threshold.

In some implementations the subset size is equal to one, and wherein the method further comprises releasing a random sequence of parts to next available machine tool workstations. Another innovative aspects of the subject matter described in this specification may be embodied in methods that include assigning machine tool workstations in a factory to multiple pull system groups, wherein each pull system group includes similar machine tool workstations, using Deep Learning techniques to determine, for each pull system group, candidate sequences of parts to be processed by machine tool workstations in the pull system group; and verifying whether the determined candidate sequences of parts to be processed will be delivered on time using Little's Law.

Other embodiments of this aspect include corresponding computer systems, apparatus, and computer programs recorded on one or more computer storage devices, each configured to perform the actions of the methods. A system including a collection of machine tool workstations used to process a plurality of parts; one or more computers in data communication with the collection of machine tool workstations; and a computer-readable medium coupled to one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

Another innovative aspects of the subject matter described in this specification may be embodied in methods that include using Deep Learning techniques to determine, for a factory comprising multiple machine tool workstations, a candidate sequence of parts to be processed by the machine tool workstations; and verifying whether the determined candidate sequences of parts to be processed will be delivered on time using Little's Law.

Other embodiments of this aspect include corresponding computer systems, apparatus, and computer programs recorded on one or more computer storage devices, each configured to perform the actions of the methods. A system including a collection of machine tool workstations used to process a plurality of parts; one or more computers in data communication with the collection of machine tool workstations; and a computer-readable medium coupled to one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The subject matter described in this specification can be implemented in particular embodiments so as to realize one or more of the following advantages.

In many manufacturing processes, e.g., machine job shop manufacturing, parts produced do not follow identical flow patterns. When a sequence of production follows a customer schedule date, the setup of workstation tools and geometry of a part may not match an existing setup, requiring a change of setup. Changing between setups can take a long time and is a waste of machinist labor, resulting in reduced efficiency and increased costs of the machine shop.

A system implementing the techniques described in this specification utilizes big data technology and artificial intelligence to improve the operation and output capacity of a system of machine tool workstations without additional manpower or investment in additional machines. The cost of job shop manufacturing is reduced whilst achieving on-time customer delivery. In addition, a system implementing the techniques described in this specification reduces overall machine tool workstation set up time using previously obtained and stored sensor data without requiring any engineering-intensive effort.

The techniques described in this specification are described using the example of reducing machine tool workstation set up time in a manufacturing process, however the techniques can be applied to reduce the set up time of any process steps in a manufacturing process. For example, some manufacturing processes may include operations that require setup sequencing but are not performed by machine tool workstations, e.g., operations performed by a paint booth. In addition, the techniques described in this specification can also be applied in other settings. For example, the techniques can be applied to reduce other performance measures in a manufacturing process, e.g., to reduce waste or machine downtime. As another example, the techniques can be applied in other processes that are effected by setup time, e.g., semiconductor manufacturing processes, procurement processes, or surgical preparation processes.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Introduction

Figure 1:
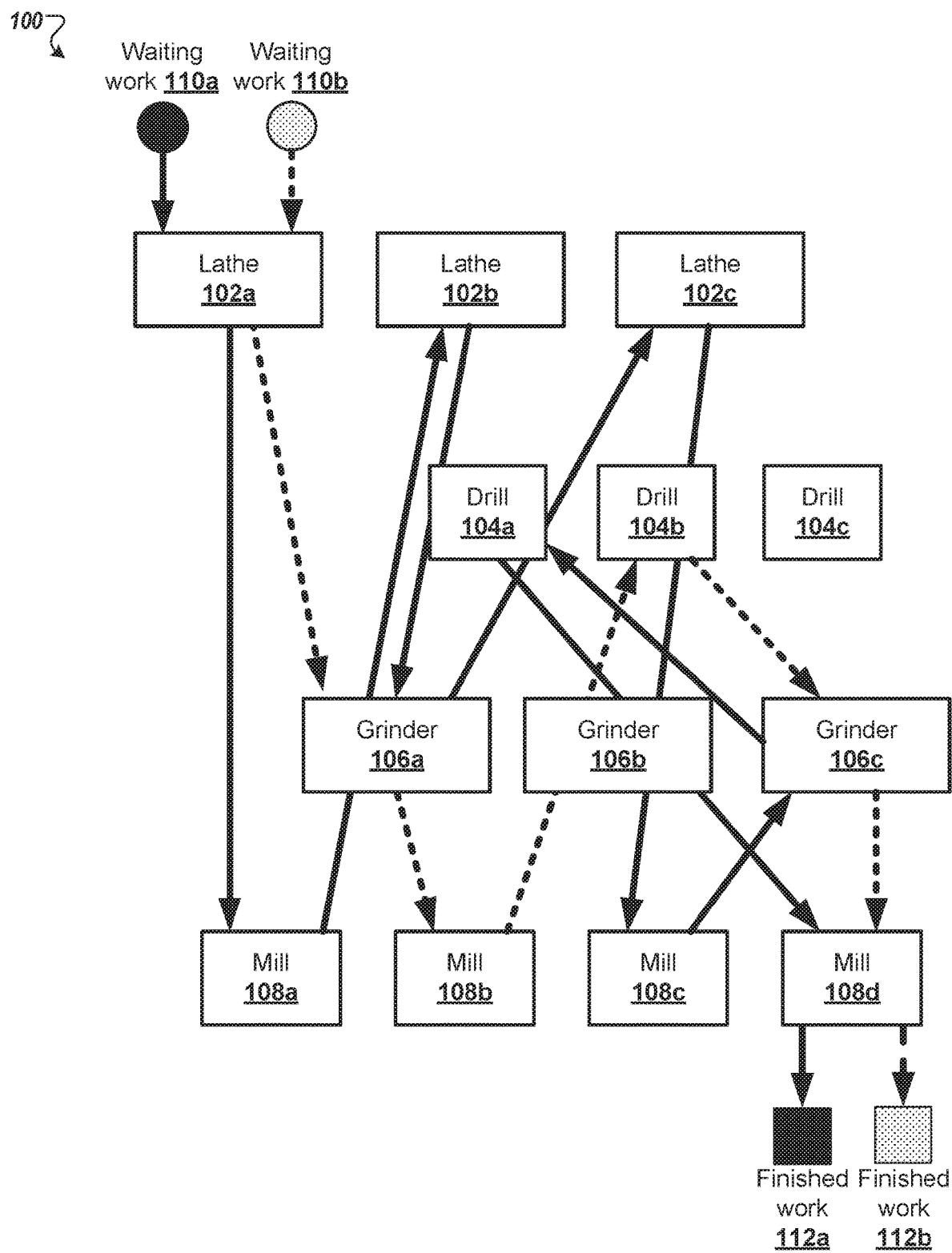
FIG. 1 is a block diagram of an example Job Shop.

Job shops are small manufacturing systems that perform customized or semi-customized manufacturing processes such as small to medium-size customer orders or batch jobs. FIG. 1 is a block diagram of an example Job Shop 100. The example Job Shop 100 includes multiple machine workstations that process waiting work, e.g., waiting work 110a-b, to produce finished work, e.g., finished work 112a-b. The example Job Shop 100 is depicted as including three lathes 102a-c, three drills 104a-c, three grinders 106a-c, and four mills 108a-d, however this is for illustrative purposes only and the Job Shop could include fewer or additional machine workstations.

During a Job Shop manufacturing process, produced products do not follow identical flow patterns—their routes through the job shop differ. FIG. 1 shows two example flow patterns that produce finished work 112a and 112b. The first flow pattern uses lathe 102a to process waiting work 110a. The processed waiting work 110a is then processed in sequence by mill 108a, lathe 102b, grinder 106a, lathe 102c, mill 108c, grinder 106, drill 104a, and mill 108d to produce finished work 112a. The second flow pattern uses lathe 102a to process waiting work 110b. The processed waiting work 110b is then processed in sequence by grinder 106a, mill 108b, drill 104b, grinder 106c, and mill 108d to produce finished work 112b.

When a sequence of production follows a customer schedule date sequence, a required setup of machine tools and a geometry of a part will generally not match the existing setup, requiring many hours for the setup changeover. In addition, there may be many different paths or routes through different machines in the factory. Typically, factories implement fixed paths which may have a larger amount of WIP than an alternative, which leads to longer manufacturing cycle time. In addition, most Job Shops include at least one machine whose capabilities are identical to another machine. Therefore, even if a part number has an identical router to a previous one in the production sequence, it may be routed to A not B, or vice versa. For example, in the first flow pattern shown in FIG. 1, grinders 106a and 106b could have identical capabilities. In this example a first part number, e.g., corresponding to waiting work 110a, could be routed from lathe 102b to grinder 106a to lathe 102c, whereas a second part number corresponding to other waiting work could be routed from lathe 102b to grinder 106b to lathe 102c.

In these cases both the first part number and second part number could eventually produce identical finished work. However, a major setup requiring many hours may ensue if it happens to be routed to the machine whose prior setup is a poor match. Furthermore, because the routings of part numbers can be different in Job Shop manufacturing, when material is released into the production process it cannot be accurately predicted when the material (or rather the corresponding processed part) will emerge. It has been said that "[w]hen we chart the flow of the material through a facility it ends up looking like a randomly tossed bowl of spaghetti .... Product is moving everywhere. There is no coordination of the product across departments. No amount of scheduling can control the inherent variation in the system when that system causes materials to move in every which way." Therefore, in Job Shop manufacturing there are very long setup times which are a waste of machinist labor, and little control over the delivery lead time resulting in poor on-time delivery.

The Lean Six Sigma method was originally applied to the case of repetitive manufacturing of a small number of part numbers that shared common routers with several other part numbers. In the original application of Lean Six Sigma, each part number was produced at least weekly and hence the manufacturing process was highly repetitive. This allowed for manufacture in cells of different machines which matched a common router, and the economical reduction of setup times with good investment payback.

However, large companies and military depots can produce a large number of part numbers, e.g., 20,000 different part numbers per year. Each part number may be produced only once or twice per year. The application of Lean Six Sigma in these settings includes first performing Pareto analysis to determine a percentage of part numbers that drive a majority of the revenue. Typically, Pareto analysis shows that 20% of the part numbers drive 80% of the revenue. These high-volume part numbers are referred to as the "vital few" and the 80% of part numbers which drive 20% of volume are dismissed as the "irrelevant many". The Lean Six Sigma method can then be applied to the "vital few" with good return on investment.

In contrast to the Lean Six Sigma method, Artificial Intelligence shows that the larger the data set, the greater the potential cost reduction. As an example, set up waste time data for an Aerospace machining company that produces 1000 part numbers per year was analyzed. Table I below shows the results of analyzing the setup waste time of both the 200 "vital few" part numbers per year and the 800 "irrelevant many."

TABLE I

File "Part Jobs 100117 to 032318 . . . 04 21 2018" (this is for 6 months of review)
Tab "LB Setup Data Summary"
Cell references to Tab "LB Setup Data"

| A | B | \multicolumn{5}{c}{(Matching Time)/(Setup Time)} | |
|---|---|---|---|---|---|---|
|   |   | C | D | E | F | G |
|   |   | >4 | | <4 | | Total |
| 1 | Number of Pin | 38 | Row2-38 | 114 | Row42-157 | 152 |
| 2 | Revenue $K | 1558 | J39 | 1049 | J155 | 2607 |
| 3 | Total Revenue | | | | | 2607 |
| 4 | Cum Setup Hours | 542 | 139 | 1502 | | 1135 |
| 5 | Cum Machining Hours | 5282 | K39 | 1855 | K155 | |
| 6 | Total Setup + Match Hours | 5824 | | 3357 | | |
| 7 | $K Revenue per hour | 0.268 | | 0.312 | | |
| 8 | Mach hours/Setup Hours | 9.7 | D41 | 1.2 | H158 | |
| 9 | AVG Factory Margin % | 25% | E40 | 22% | E156 | |
| 10 | $Factory Margin | 390 | | 231 | | |
| 11 | Total $ Factory Margin | 620 | | | | |
| 12 | Avail Hours with 75% Setup Red | | | 1126.5 | | |
| 13 | Factory Margin with 75% redn | | | 28% | F163 | |
| 14 | $ Factory Margin | | | 294 | E163 | |
| 15 | Additional Revenue $K | 301 | | 352 | | |
| 16 | Additional $FM at 28% | 75 | | 99 | | |
| 17 | Total $FM | | | 392 | | |
| 18 | Current EBITDA at 20% of Revenue | | | | | 521.4 |
| 19 | Projected EBITDA with setup reduction | | | | | 620 |
| 20 | % increase in EBITDA with no increase in FM % | | | | | 19% |
| 21 | Additional $FM at 45% due to labor reduction | | | 158 | | |
|   | Projected EBITDA with setup reduction with FM = 45% | | | | | 680 |
|   | File "LB 45% Margin March 28 FS" | | | | | 30% |

In cell C1 of Table I, 38 part numbers generate 1,558K dollars of Revenue (C2) and only generate $542K of setup waste (C4). The ratio of value-add machining hours to waste hours is 9.7(C8). By contrast, the 114 low volume part numbers produced on the same lathe have a ratio of value-add machining hours to waste hours of 1.2(E8). This shows that setup waste time nearly equals value-add machining time. If this waste could be reduced to the level of C8 plant wide, the total production capacity would increase between 10-20% per year with no increased investment in machines or manpower. The so-called "irrelevant many" are therefore highly relevant and not to be dismissed, and a cost-effective means of reducing setup time for parts that are only produced a few times per year, as described in this specification, is needed.

Known attempted solutions to the Job Shop manufacturing problem include large batch techniques, sequencing without regard for on-time delivery, and applications of mathematical models, as described below:

i) Large Batch techniques: organizations have attempted to compensate for the Job Shop manufacturing problem of setup waste by building a large batch of each part number which will satisfy a year's demand. Such large batches are generally far beyond the quantity immediately needed by the customer. The long setup time is amortized over the large batch, most of the cost goes into inventory, hence the short-term profitability "appears" good. However, inevitably this process leads to inventory write-downs and losses, as customers either fail to purchase the projected demand, or the customer issues a revised spec of the part number and the products in inventory must be scrapped or reworked. In addition, producing a batch to satisfy a year's demand ties up the respective machine workstations for a long period, delaying the production of other products to the detriment of on-time delivery. For example, 35% of Finished Goods Inventory of the above mentioned Aerospace manufacturing company had not moved in 4 years.

ii) Sequencing without regard for on-time delivery: other organizations have produced part numbers in a sequence which minimizes setup waste. For example, one firm noted that when a machine tool must change the diameter of bar stock being machined, the chuck changeover took more than an hour. The firm addressed this problem by starting the week on Monday by producing all the different products that used 2 inch diameter bar stock, then changing the chuck to 3 inches and running all those products, and ending the week with all products requiring 4 inch bar stock. The next Monday they completed the 4 inch products, then 3 inch and finished the week by returning to 2 inch bar stock. This introduces a potential 1.5 week delay for a job that missed its bar stock diameter run.

Since most Aerospace products are processed in series on three different machines, a potential 4.5 week delay ensues plus the time for de-burr, clean, QC, Pack and Ship. The whole process takes more than two months. The only way to assure on-time delivery within a month is to build larger batches which will increase the 4.5 week delay to 9 weeks and stretch delivery to three months. The company is late and faces inventory exposure. Moreover, the setup time reduction is limited to the time saved for chuck changes, and fails to sequence in relation to tool changes. For example, a two turret 24 tool lathe may require 29 hours to change over all tools, a waste that cannot be avoided by only reducing chuck change time.

iii) A Mathematical NP-Hard problem: Finally, the Job Shop manufacturing problem can be considered a mathematical model where the solution to the problem is to mathematically find a sequence of products which will result in the least waste.

Forming the mathematical model can proceed as follows: assume that a given factory is to produce N different part numbers, and that the factory contains M different machine workstations. There are N choices for selecting the part to be run first, N−1 choices for the second part, etc. There are therefore N! total sequences in the production schedule. There are also M permutations of machine workstations on which to run the parts. Therefore, the total number of possible production sequences in which parts can be run is $\{S\}=(N!)^M$. The goal is to find the production sequence of running parts which results in 1) lowest waste cost, and 2) a predetermined success rate of on-time delivery, e.g., 95% on-time delivery.

As a working example, assume M=1. In this example, determining the production sequence of parts that minimizes cost and meets the predetermined success rate of on-time delivery involves the infeasible (or at least computationally inefficient) task of evaluating 10!≈3.6 million sequences of 10 part numbers to see which sequence results in the lowest total setup time/cost.

Heuristics have been derived to avoid this combinatorial computation. One example heuristic rule seeks to minimize overall cycle time. It is hoped that, by minimizing cycle time or span time through the process, on-average, parts will be produced near to customer schedule. The related "heuristic" rule can be formulated as: "assume that the part number with the lowest setup plus machining time is denoted $P_1$, the second lowest $P_2$, etc. Then run the parts in the sequence $P_1 \leq P_2 \ldots \leq P_N$. This will result in the lowest average, or mean, delivery cycle time". While this method can result in a lower mean cycle time, it also implies that part number N in the production sequence will be produced last in the sequence even though it may be the first required by customers. Therefore, the on-time delivery of each part number cannot be guaranteed. This example heuristic is at best a $2^{nd}$ order correction to cycle time reduction.

Additional example heuristics are described below in Table II. Each of the additional example heuristics described in Table II were evaluated based on the following criteria: i) is the method compatible for meeting customer ship date with 95% probability, and ii) does the method minimize the waste of setup time? All eight heuristics failed at least one of the two criteria.

In any case, heuristics are typically not used to schedule a factory. Rather, real Job Shops set up machine workstations and build parts in a sequence based on customer delivery dates. These sequences are effectively random sequences with respect to setup time, resulting in huge setup time and capacity waste. Little or no consideration of reducing setup time by exploiting common geometry and tooling is applied.

Overview

This specification describes a system for controlling the operation of multiple machine tool workstations to reduce a total setup cost of a manufacturing process whilst maintaining target delivery time. The system electronically or physically groups the multiple machine tool workstations into multiple functional groups based on specific properties of the machine tool workstations. The system uses machine learning techniques and cycle time data to identify subsets of part numbers to be processed by the functional groups which can be run in sequence to minimize the cost of setup following the processing of a previous set of part numbers. Little's law is then dynamically applied to determine a lowest delay time relative to a respective minimum manufacturing cycle time for each functional group. The determined delay times for each functional group can be used to generate a target acceptable delay time. If all part numbers will be processed within the target acceptable delay time, parts are released for processing by the machine tool workstations. Otherwise, the system iteratively repeats the process with smaller subset sizes until the part numbers will be processed within the target acceptable delay time.

For convenience, the present description describes controlling operations of machine tool workstations using artificial intelligence to reduce a total setup cost of a manufacturing process whilst maintaining target delivery times. However, the presently described techniques can equally be applied to reduce other machine tool workstation performance parameters in a manufacturing process, e.g., machine downtime or waste. In addition, the presently described techniques can be applied to other applications that are characterized as high mix low volume with different flow paths through multiple workstations. Furthermore, the pres-

TABLE II

| | | Description of Heuristic | Lean Impact |
| --- | --- | --- | --- |
| 1 | R | (Random) - Pick any Job in Queue with equal probability. This rule is often used as benchmark for other rules | Longest Setup Time |
| 2 | FCFS | (First Come First Serve) - Jobs are processed in the order in which they arrived at the work center (also called earliest release date) | Longest Setup Time |
| 3 | SPT | (Shortest Processing Time) - This rule tends to reduce both work-in-process inventory, the average job completion (flow) time, and average job lateness. | Worst on-time delivery |
| 4 | EDD | (Earliest Due Date) - Choose Job that has earliest due date | Longest Setup Time |
| 5 | CR | (Critical Ratio) = Processing Time/Time until due (Due Date - Current Time). Take the highest value. | Longest Setup Time |
| 6 | LWR | (Least Work Remaining) - This rule is an extension of SPT variant that considers | Longest Setup Time |
| 7 | ST | (Slack Time) = Time until job is due - (Sum of processing time remaining). Take the job with the smallest amount of slack time. | Longest Setup Time |
| 8 | ST/O | (Slack Time per Remaining Operation) = slack time divided by number of operations remaining. Take the job with the smallest amount of slack time per remaining operation | Longest Setup Time | ently described techniques can be applied to systems outside of manufacturing, e.g., any system or process that is effected by setup time.

For example, the presently described techniques can be applied to semiconductor manufacturing processes. Whilst semiconductor factories differ significantly from machine shops, they also experience setup time in photolithography, wet etch, dry etch, etc. The presently described techniques can be applied to determine a commonality among the setup of the jobs resulting in a sequence that minimizes setup time waste while assuring on-time.

As another example, the presently described techniques can be applied to settings where legacy computer systems engaged in a procurement process experience a setup time/learning curve. For example, a division with 12 legacy computers could be accessed to purchase material of the 12 acquired companies. This is effectively a setup time. By implementing the presently described techniques a software application that can access all 12 legacy computers, find common patterns of demand of a single commodity (which effectively consolidates all procurement) and reduce setup time can be produced.

As another example, the presently described techniques can be applied to surgical preparation processes, e.g., processes for surgical cart set up. For example, preparing a cardio-vascular surgical cart prior to surgery can take a significant amount of time, e.g., hour. Different surgeons may request a particular set up, e.g., a personalized list of surgical tools such as clamps, scalpels and sutures. The presently described techniques can be applied to determine common application patterns and guide surgeons to develop a common surgical cart setup. Such standardizations can result in large reductions of setup time and eliminate errors.

As another example, the presently described techniques can be applied to patient processing processes, e.g., in a hospital or clinic. In this example the workstations may correspond to different departments within the hospital/clinic or different items of medical equipment to be used on the patients, each of which experience setup times in between processing individual patients. The presently described techniques can be applied to determine a commonality among the setup of the departments or equipment that results in a patient processing sequence that minimizes setup time waste while assuring patients are processed in a timely manner.

Example System for Controlling the Operation of Machine Tool Workstations

Figure 2:
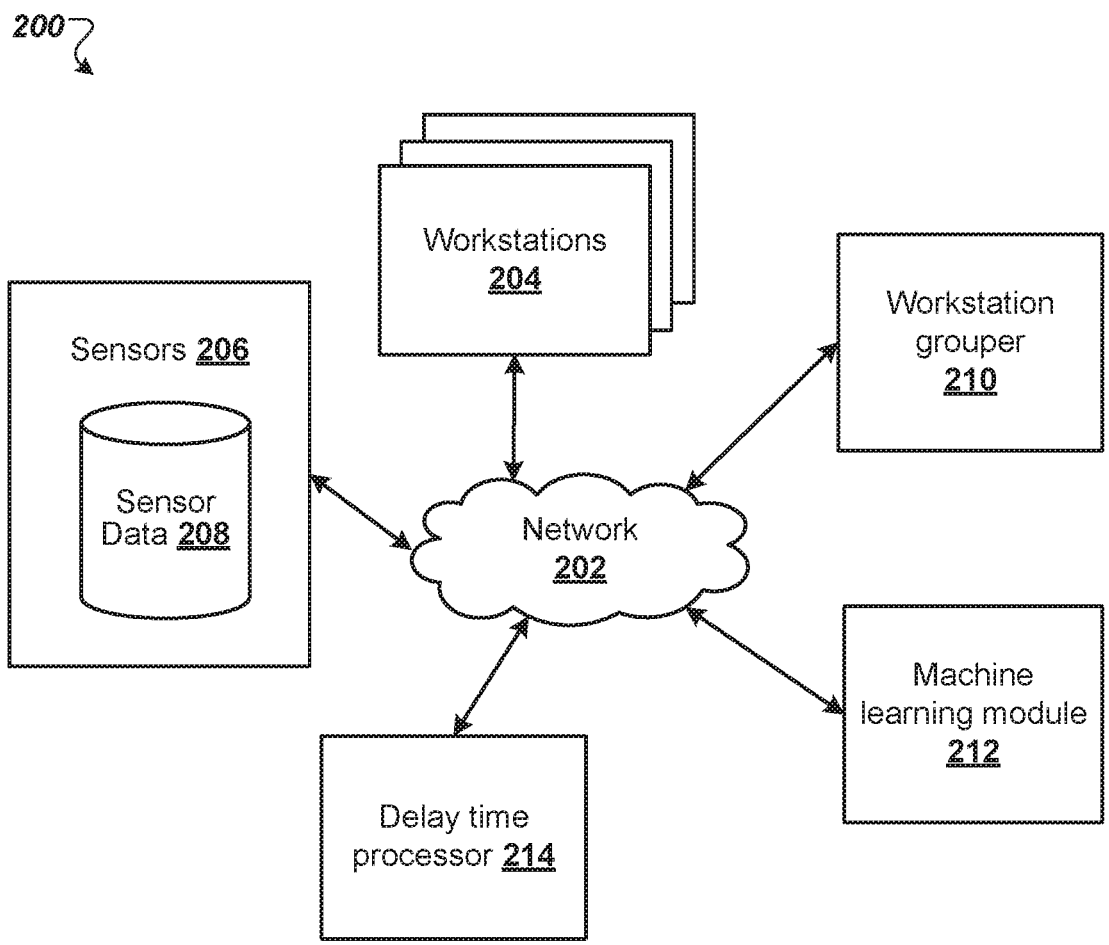
FIG. 2 is a block diagram of an exemplary system.

FIG. 2 is a block diagram of an example system 200. The system 200 is an example of a system implemented as computer programs on one or more computers in one or more locations, in which the systems, components, and techniques described in this specification can be implemented.

In example system 200, a computer network 202, such as a local area network (LAN), wide area network (WAN), the Internet, or a combination thereof, connects, one or more workstations 204, one or more sensors 206, a sensor data store 208, workstation grouper module 210, machine learning module 212, and delay time processor 214. Although the example system 200 shows the workstations 204, sensors 206, sensor data store 208, workstation grouper module 210, machine learning module 212, and delay time processor 214 as separately implemented components, in some implementations, some or all of the components may be implemented as a single computing system/integrated component. For example, the sensors 206, workstation grouper module 210, and delay time processor 214 may be implemented as a single integrated component, whereas the sensor data store 208 may be implemented on a centralized server that communicates and exchanges data with the system 200 and the machine learning module 212 may be implemented in an external cloud computing environment that communicates and exchanges data with the system 200.

The one or more workstations 204 represent processing points in a system that transforms new work items into partially-completed or fully-completed work items. For example, the system may be a factory or Job Shop that manufactures work pieces, e.g., welded work pieces. In this example the one or more workstations 204 may be machine tool workstations, e.g., welding stations, and the new work items may be parts to be shaped or machined, e.g., welded, to partially or fully complete a work piece. In some implementations the one or more workstations 204 may further include other machines, devices or structures involved in a manufacturing process, e.g., paint booths. For convenience, the remaining description of FIG. 2 is described with reference to a factory that includes multiple machine tool workstations 204. The one or more machine tool workstations 204 may include drilling machines, turning machines, i.e., lathes, grinding machines, or boring machines. Other examples include milling machines, cutting tools, broaching machines, drill presses, gear shapers, hobbing machines, hones, screw machines, shears, shapers, saws, planers, stewart platform mills, or multitasking machines. Each machine tool workstation 204 is associated with multiple performance parameters that describe the performance of each machine tool workstation. The performance parameters may include one or more parameters relating to setup time, machine downtime, scrap percentage, processing time per unit, batch size, minimum work in progress (WIP) required to produce a fixed number of parts per hour, and a number of different part numbers.

For example 12 tool Okuma lathes may be used to process parts from stainless steel, Inconel, etc. When one of these lathes is about to finish a job, material and tooling for the next job in the schedule may be delivered to the lathe. Frequently, the diameter of the raw bar stock will be different, requiring a chuck change can take around an hour. In addition, all or most of the 12 tools in the turret may have to be changed and adjusted for stick-out length—taking another hour or more. In addition, trial parts may be run and checked by quality control, taking another hour. In all, the setup time from one part to another part could be around 4-6 hours.

Some or all of the performance parameters may be adjusted by making improvements to the machine tool workstations 204 or to the work process performed by the machine tool workstations 204. For example, the total machine tool workstation setup time for a particular process is dependent on how the collection of parts associated with the parts are released to the machine tool workstations 204. Therefore, improving the ordering of the release of the collection parts to the multiple machine tool workstations 204 can improve, e.g., reduce, the total setup time.

The one or more sensors 206 monitor the one or more machine tool workstations 204 and/or the process performed by the factory or job shop. For example, the one or more sensors 206 may be distributed throughout the factory or Job Shop. In some implementations the one or more sensors may include barcode scanners that scan parts as they pass through different points in the workstation. Each sensor can include an input module that imports measured data associated with the work process performed by the multiple machine tool workstations 204 or data associated with one or more of the machine tool workstations 204 involved in the work process. The input module may also receive additional data from a source external to the system 200, or may receive data from a source within the system 200. The input module may also access data, either from within the system 200 or from a source external to the system 200.

For example, the imported data may include one or more of: measured transit time information of items being processed by each machine tool workstation, measured transit time information for items flowing through the work process, e.g., a measured duration of time for each item to enter the process as new work and leave the process as completed work, WIP data such as a measured quantity of WIP in each workstation, a measure of all WIP in the process at a particular time, all measured WIP in the process over a defined time period, or a measured WIP for a particular part number, a particular type of workstation or a particular task within a transactional process. The WIP in any process may include more than one type of work unit or more than one type of task. In some implementations, the input module may reformat and/or transform the data such that the data may be processed and stored by other components within the system 200.

In some implementations the imported data may also include production control data and accounting data. Production control data can include data related to the one or more machine tool workstations 204 involved in the work process. For example the production control data may include data describing the machine tool workstations, e.g., machine tool workstation type, age, make and model. The production control data may also include values for each machine tool workstation performance parameter for each machine tool workstation at a particular time or for a defined time period. The production control data may also include user-specified values for each machine tool workstation or the work process performed by the machine tool workstations, e.g., acceptable uninterrupted machine tool workstation runtimes. Accounting data can include data accessed by the sensors (e.g., from external databases) regarding costs and overheads associated with a work process, e.g., dollars of labor and supply chain overhead expended per month.

The one or more sensors 206 also include or are in data communication with the sensor data store 208. Data received through the input module can be stored in the sensor data store 208. The sensor data store 208 may be, for example, a relational database that logically organizes data into a series of database tables. Each database table may arrange data in a series of columns, e.g., where each column represents an attribute of the data stored in the database, and rows, e.g., where each row represents attribute values. The sensor data store 208 may be, for example, an object-oriented database that logically or physically organizes data into a series of objects. Each object may be associated with a series of attribute values. The sensor data store 208 may also be a type of database management system that is not necessarily a relational or object-oriented database. For example, a series of XML (Extensible Mark-up Language) files or documents may be used, where each XML file or document includes attributes and attribute values. Data included in the sensor data store 208 may be identified by a unique identifier such that data related to a particular process may be retrieved from the sensor data store 208. The sensor data store 208 can further include production control data and accounting data.

The workstation grouper module 210 is configured to identify functional groupings of the machine tool workstations 204. To identify functional groupings of the machine tool workstations 204 the workstation grouper module 210 may access relevant sensor data stored in the sensor data store 208, e.g., production control data and measured sensor data.

Each functional group (also referred to herein as a "AI Pull System Group," "Pull System Group" or simply a "Pull Group") can include workstations of the same type. For example, some or all drilling machines included in a factory may form one functional group, and some or all lathes included in a factory may form another functional group. As another example, workstations with a common Kanban inventory, e.g., workstations that share a common pool of jobs that are held in WIP, may form one functional group. In some implementations each functional group can be configured to receive a constrained fixed number of days of WIP per batch of parts, where the number of days depends on an average setup and machining time per part over each workstation in the functional group.

The number of multiple functional groups identified by the workstation grouper module 210 is dependent on, amongst other things, properties of the machine tool workstations 204. For example, in some cases the workstation grouper module 210 may group all cutting machines into one functional grouping. In other cases the workstation grouper module 210 may group all cutting machines into multiple functional groups of cutting machines that may be positioned near each other in the factory. Alternatively or in addition, the number of multiple functional groups may also be dependent on acceptable uninterrupted machine tool workstation runtimes. For example, boring machines that must be serviced after a predetermined amount of uninterrupted runtime may be grouped into a same functional group.

In some implementations the workstation grouper module 210 is further configured to implement identified functional groupings of machine tool workstations, e.g., electronically or physically.

The workstation grouper module 210 may be a specialized hardware or software module that is pre-programmed or pre-configured to invoke a specialized or proprietary grouping functionality only. In another aspect, the workstation grouper module 210 may be a more generic hardware or software module that is capable of implementing generic and specialized functionality, including grouping functionality.

The machine learning module 212 is configured to perform machine learning operations such as training and implementing neural networks. For example, the machine learning module 212 can receive data from the workstation grouper module 210 that identifies multiple functional groupings of the machine tool workstations 204. The machine learning module 212 can use data received from the workstation grouper module 210 to dynamically train multiple neural networks corresponding to each of the multiple functional groups specified by the received data using training examples. Each neural network can be trained to process a data input representing multiple parts to be processed by a type of workstation included in a respective functional group and to generate a data output representing a sequence of ordered subsets of the multiple parts that, when processed by the respective functional group, produces a reduced setup time for the workstations in the functional group. Other performance metrics may also be used, e.g., units produced per unit time, scrap percentage, machining time per unit, and machine downtime. The size of the sequences of ordered subsets output by the neural networks can be system-specific and chosen by a user in advance.

The training data for each neural network can include data inputs representing multiple parts to be processed (e.g., part numbers) by the type of workstations included in the functional group and corresponding sequences of ordered subsets of the multiple parts that, when processed by the functional group, produce a reduced setup time for the workstations in the functional group, where the corresponding sequences of ordered subsets of the multiple parts have been determined using a Branch and Bound method (described in more detail below). The training data can be stored locally at the machine learning module 212 or stored at a centralized server that communicates and exchanges data with the machine learning module 212.

To dynamically train a neural network on a respective training data set, the machine learning module 212 can process data inputs representing multiple parts in accordance with current values of parameters of the neural network to generate a predicted sequence of ordered subsets of the multiple parts, and adjust the current values of the parameters of the neural network based on the predicted sequence of ordered subsets of the multiple parts and the sequence of ordered subsets of the multiple parts determined using the branch and bound method.

To implement a trained neural network at runtime, the machine learning module 212 can receive data representing parts to be processed by machine tool workstations in the factory. This data can be received from the sensors 206 or from an external source, e.g., via user input. The machine learning module 212 can process the received data using the trained neural networks to generate outputs representing corresponding sequences of ordered subsets of the parts that, when processed by the functional groups, produce a reduced setup time for the workstations in the functional group.

The machine learning module 212 may be a specialized hardware or software module that is pre-programmed or pre-configured to invoke a specialized or proprietary machine learning functionality only. In another aspect, the machine learning module 212 may be a more generic hardware or software module that is capable of implementing generic and specialized functionality, including machine learning functionality. In some implementations the machine learning module 212 may be implemented in the cloud, e.g., by a cloud computing service. The type of neural networks trained and implemented by the machine learning module 212 is dependent on the particular hardware and software included in the machine learning module 212, and can vary.

The delay time processor 214 is configured to receive data representing generated sequences of ordered subsets of parts to be processed from the machine learning module 212 and to access data stored in the sensor data store 208. The delay time processor 214 processes the received data to compute average delay times that would be incurred if the generated sequences of ordered subsets of parts would be released to the respective functional groups. Each average delay time is computed relative to a respective minimum manufacturing cycle time (where the minimum manufacturing cycle time refers to the shortest time required to process a part through subsequent machines to obtain a complete part.) The delay time processor 214 computes the average delay times using Little's Law which states $$\text{Manufacturing cycle time in days} = \frac{\text{Number of units of } WIP}{\text{Number of units exiting } WIP \text{ to finished goods per day}}$$

The delay time processor 214 can determine whether each of the computed average delay times is less than a predetermined threshold. In response to determining that an average delay time for a functional group is less than a predetermined threshold, the delay time processor 214 can cause parts to be released to the functional group according to the generated sequence of ordered subsets of the collection of parts for processing. In response to determining that an average delay time for a functional group exceeds the predetermined threshold, the delay time processor 214 can cause the machine learning module 212 to repeat the operations described above with a reduction in the size of the ordered subsets in the generated sequence of ordered subsets until the delay time processor 214 determines a computed average delay time is less than the predetermined threshold. If the size of the ordered subsets reaches one, the delay time processor 214 can cause a random sequence of parts to be released to next available machine tool workstations.

The delay time processor 214 may be a specialized hardware or software module that is pre-programmed or pre-configured to invoke a specialized or proprietary functionality only. In another aspect, the delay time processor 214 may be a more generic hardware or software module that is capable of implementing generic and specialized functionality, including computing average delay times.

Figure 3:
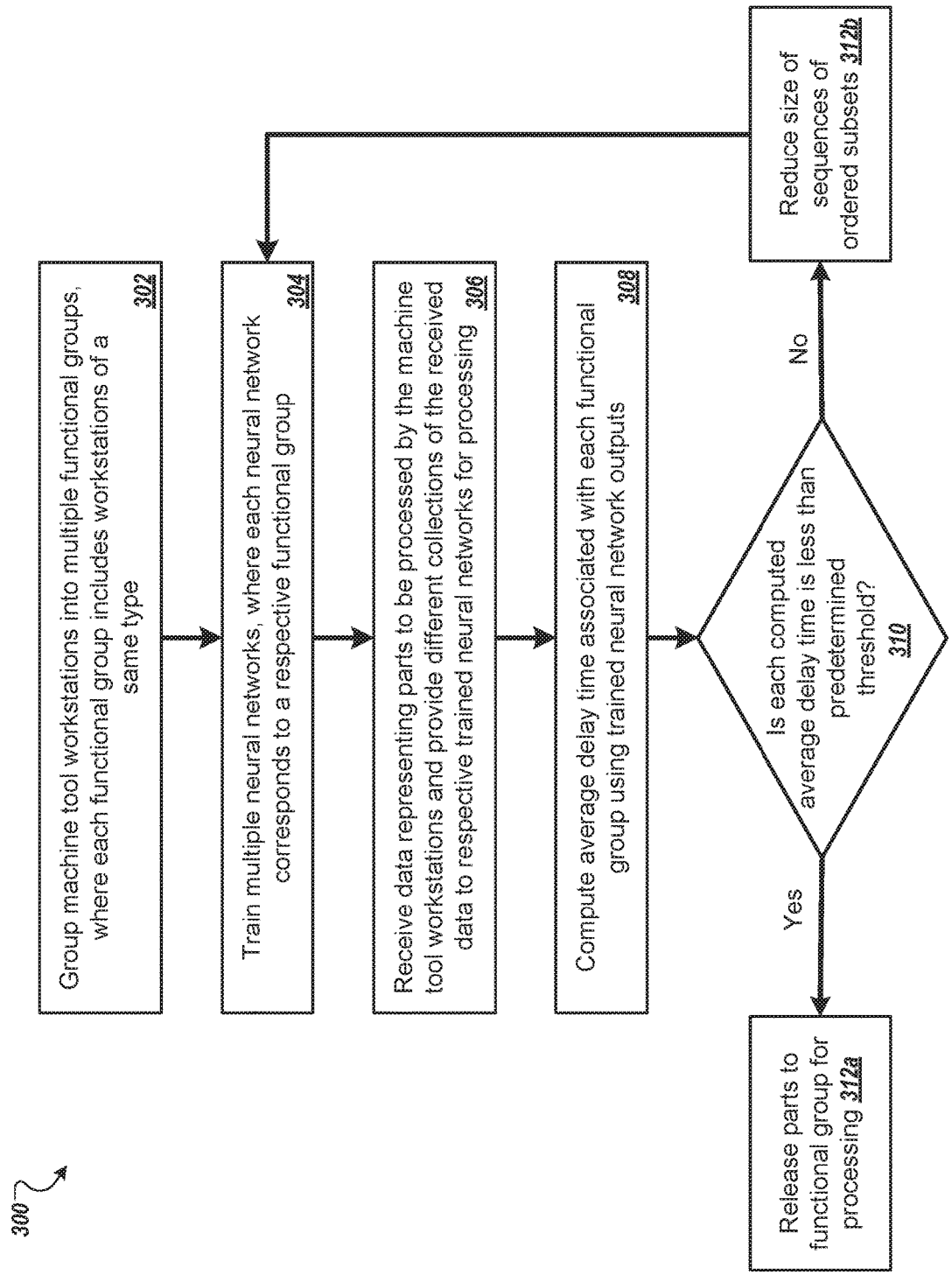
FIG. 3 is a flowchart of an example process for processing multiple parts using multiple machine tool workstations in a factory.

Example Methods for Processing Multiple Parts Using Multiple Machine Tool Workstations FIG. 3 presents an example process 300 for processing parts using multiple machine tool workstations. For example, the example process 300 can be used to process N different parts in a factory including M different machine tool workstations, where each of the N parts can progress through the factory using a respective path of up to M machines and each of the M machines may require some setup time to change over from the production of one part to another. For convenience, the process 300 will be described as being performed by a system of one or more computers located in one or more locations. For example, the process 300 may be performed by one or more processors included in a processing system such as the system 200 described with reference to FIG. 2 above.

The system groups the multiple machine tool workstations into multiple functional groups (step 302). Each functional group can include workstations of the same type. For example, some or all drilling machines included in the factory may form one functional group, and some or all lathes included in the factory may form another functional group. As another example, workstations with a common Kanban inventory may form one functional group. As another example, all workstations that can run a given part number can be considered as functionally identical and form one or more functional groups. Grouping the multiple machine tool workstations into the above described functional groups avoids the need to solve the Job Shop manufacturing problem for the whole collection of N parts and M machine tool workstations by evaluating $(N!)^M$ sequences of parts, as described in the remaining description of FIG. 3.

In some implementations each functional group can be configured to receive a constrained fixed number of days of WIP per batch of parts, where the number of days depends on an average setup and machining time per part over each workstation in the functional group.

The number of multiple functional groups is dependent on, amongst other things, properties of the plurality of machine tool workstations. For example, in some cases all cutting machines may be grouped into one functional grouping. However, in other cases all cutting machines may be grouped into multiple functional groups of cutting machines that may be positioned near each other in the factory. Alternatively or in addition, the number of multiple functional groups may also be dependent on acceptable uninterrupted machine tool workstation runtimes. For example, boring machines that must be serviced after a predetermined amount of uninterrupted runtime may be grouped into a same functional group. Alternatively or in addition, the number of multiple functional groups may depend on both the computational capabilities of the neural networks described below with reference to step 304 and properties of the machine tool workstations. Example functional groups are depicted and described below with reference to FIG. 4.

The system trains a neural network corresponding to each of the multiple functional groups (step 304). The neural networks are dynamically trained on respective training data to process a data input representing multiple parts, e.g., 50-100 parts, to be processed by the type of workstations included in the functional group and to generate a data output representing a sequence of ordered subsets, e.g., subsets of size 4, of the multiple parts that, when processed by the functional group, produces a reduced setup time for the workstations in the functional group. Other performance metrics may also be used, e.g., units produced per unit time, scrap percentage, machining time per unit, and machine downtime. The size of the sequences of ordered subsets output by the neural networks can be system-specific and chosen in advance. For example, the size of the sequences of ordered subsets can be dependent on acceptable uninterrupted machine tool workstation runtimes (since longer sequences can exceed uninterrupted machine tool workstation runtimes).

The training data for each neural network can include data inputs representing multiple parts to be processed (e.g., part numbers) by the type of workstations included in the functional group and corresponding sequences of ordered subsets of the multiple parts that, when processed by the functional group, produce a reduced setup time for the workstations in the functional group, where the corresponding sequences of ordered subsets of the multiple parts have been determined using a branch and bound method.

Training a neural network on a respective training data set can include processing the data input representing multiple parts in accordance with current values of parameters of the neural network to generate a predicted sequence of ordered subsets of the multiple parts, and adjusting the current values of the parameters of the neural network based on the predicted sequence of ordered subsets of the multiple parts and the sequence of ordered subsets of the multiple parts determined using the branch and bound method.

The system receives data representing parts to be processed by machine tool workstations in the factory. The system provides different collections of the received data to respective trained neural networks for processing (step 306). For example, data representing parts to be processed by drilling machines can be provided to neural networks corresponding to functional groups of drilling machines, and data representing parts to be processed by cutting machines can be provided to neural networks corresponding to functional groups of cutting machines. The trained neural networks process received data to generate data representing corresponding sequences of ordered subsets of the parts that, when processed by the functional groups, produce a reduced setup time for the workstations in the functional group.

The system computes an average delay time relative to a respective minimum manufacturing cycle time associated with each of the generated sequences of ordered subsets of the parts, i.e., associated with each functional group (step 308). The system computes the average delay times using Little's Law which states $$\text{Manufacturing cycle time in days} = \frac{\text{Number of units of } WIP}{\text{Number of units exiting } WIP \text{ to finished goods per day}}$$

The system can compute the average delay time according to Little's Law by dividing sensor data on the number of units of Work In Process at each Pull Group by data collected by the sensors that monitor the completion rate of product of the multiple machine tool workstations.

The system determines whether each of the computed average delay times is less than a predetermined threshold (step 310). For example, to determine whether a particular computed average delay time is less than the predetermined threshold or not, the system may first compute a standard deviation of all of the computed delay times. The system may then add a multiple of the computed standard deviation, e.g., three times the computed standard deviation, to the particular computed average delay time to generate an adjusted average delay time, e.g., to generate a three-sigma limit. The system can then determine whether the adjusted average delay time is less than the predetermined threshold or not.

In response to determining that an average delay time for a functional group is less than a predetermined threshold, the system releases parts according to the generated sequence of ordered subsets of the collection of parts to the functional group for processing (step 312a). Releasing parts according to the generated sequence of ordered subsets of the collection of parts to the functional group for processing results in the generation of processed parts. The system may therefore also route subsets of processed parts to other functional groups for further processing.

In response to determining that an average delay time for a functional group exceeds the predetermined threshold (step 312b), the system repeats steps 304-312 where, at each repetition, the system iteratively reduces the size of the ordered subsets in the generated sequence of ordered subsets until the average delay time is determined to be less than the predetermined threshold. If the size of the ordered subsets reaches one, a random sequence of parts may be released to next available machine tool workstations.

Example process 300 is described for N different parts in a factory including M different machine tool workstations, where each of the N parts can progress through the factory using a respective path of up to M machines and each of the M machines may require some setup time to change over from the production of one part to another. However, example process 300 can also be applied to other settings, e.g., manufacturing processes that include multiple process steps performed by different machine tools or other machines, devices or structures or other processes that include multiple process steps and are effected by setup time.

Figure 4:
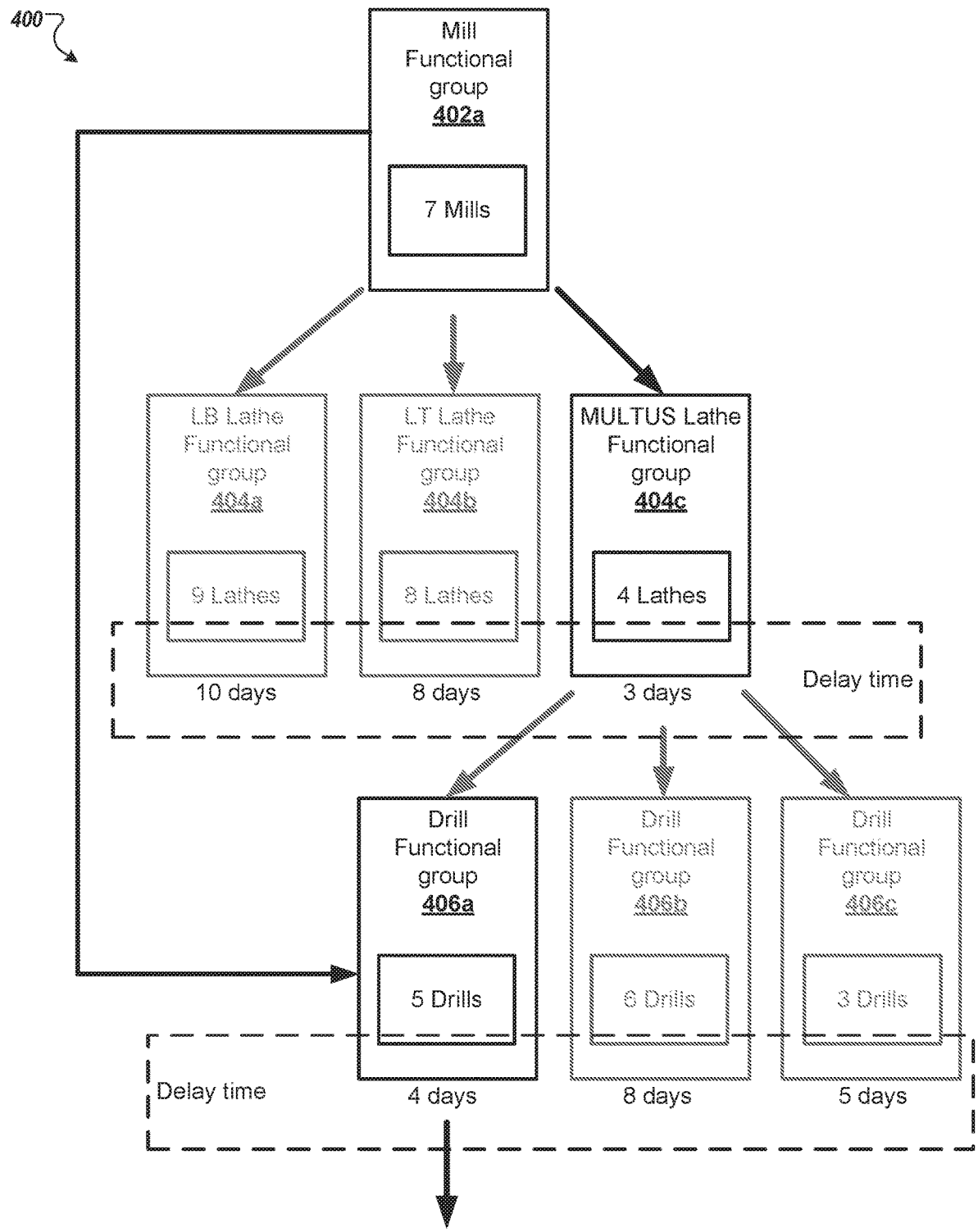
FIG. 4 is a block diagram of example functional groups and example paths of parts generated based on dynamically calculated minimum cycle times.

FIG. 4 is a block diagram 400 of example functional groups and example paths of parts generated based on dynamically calculated minimum cycle times, as described above with reference to example process 300 of FIG. 300.

The example functional groups shown in FIG. 4 include one mill functional group 402a, three lathe functional groups 404a-c, and three drill functional groups 406a-c. Each functional group includes multiple machine tool workstations. For example, mill functional group 402 includes 7 drills, lathe functional group 404a includes 9 lathes, etc. The number, type and size of functional groups shown in FIG. 4 are illustrative only—the number, type and size of functional groups generated by the system at step 302 of example process 300 can vary based on the particular factory/collection of machine tool workstations.

Conventionally, systems may process parts according to a path of machine tool workstations that is determined and fixed in advance. For example, if a particular part is to be machined by a mill and then a lathe, the fixed path may route such parts from a particular mill in the factory, e.g., a mill in functional group 402a, to a particular lathe, e.g., a lathe in functional group 404a, based on some factors or properties that can be determined in advance, e.g., location of the machines or machine operator. However, in the example shown in FIG. 4, routing parts from a mill in functional group 402a to a lathe in functional group 404a may delay output by an average of 10 days (as calculated by Little's Law).

Instead, by following example process 300, systems may process parts according to a path of machine tool workstations that is dynamically determined and adjusted, e.g., daily, such that the total processing of parts can achieve a reduced or even optimal delay time. In other words, example process 300 can be repeatedly implemented using current sensor data and forecasted cycle time data to adjust the path of machine tool workstations for the parts.

For example, FIG. 4 shows how, at a current time, a lowest delay time can be achieved by routing a subset of milled parts that need metal removing operations from the mill functional group 402a to the 4 Multus lathes included in lathe functional group 404c, and a subset of parts that need drilling from the mill functional group 402a to the 5 drills included in functional group 406a.

Figure 5:
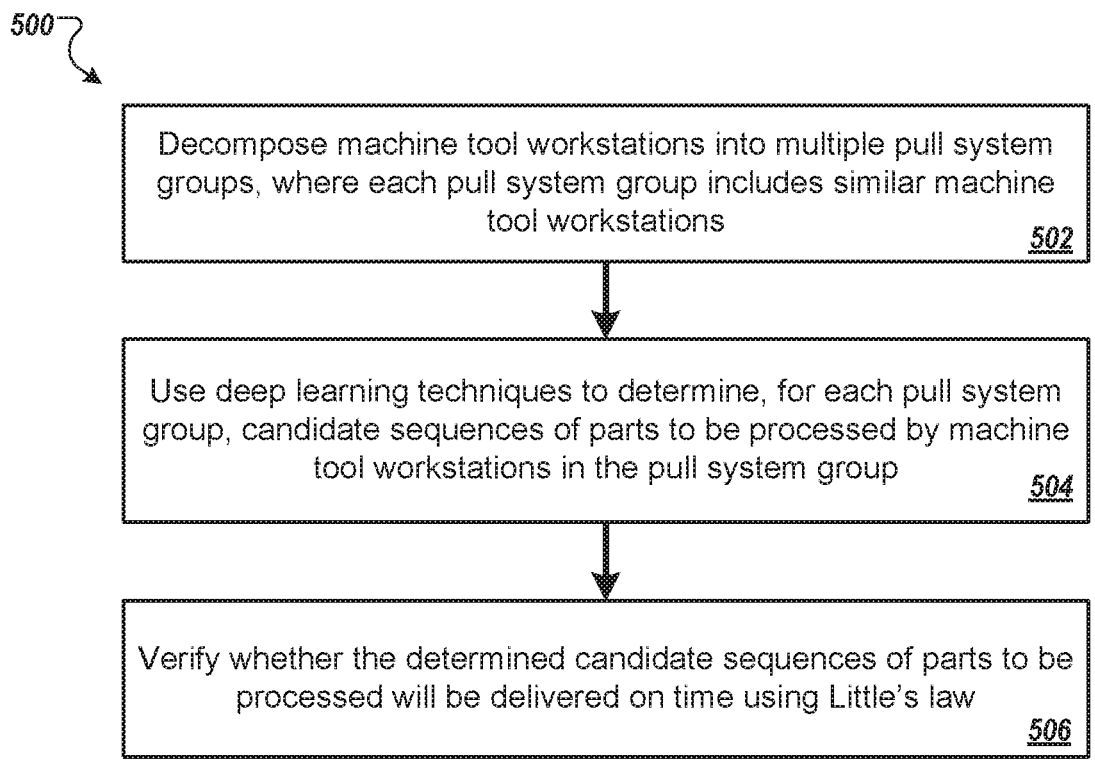
FIG. 5 is a flowchart of a first example process for verifying whether sequences of parts to be processed by multiple machine tool workstations will be delivered on time.

FIG. 5 presents a first example process 500 for verifying whether sequences of parts to be processed by multiple machine tool workstations will be delivered on time. For example, the process 500 may be performed by one or more processors included in a processing system such as the system 200 described with reference to FIG. 2 above. The example process 500 can be performed in conjunction with and/or using some or all of the techniques described above with reference to example process 300 of FIG. 3.

The system assigns multiple machine tool workstations in a factory into multiple pull system groups, where each pull system group can include similar machine tool workstations. (step 502). Assigning multiple machine tool workstations into multiple pull system groups is described in more detail above with reference to step 302 of FIG. 3.

The system uses artificial intelligence deep learning techniques to determine, for each pull system group, candidate sequences of parts to be processed by machine tool workstations in the pull system group (step 504). The candidate sequences of parts include sequences of parts that, when processed by respective machine tool workstations, reduce overall machine tool workstation setup time. Using deep learning techniques to determine candidate sequences of parts to be processed by machine tool workstations in a pull group is described above with reference to steps 304 and 306 of FIG. 3 and in the additional details described below.

The system verifies whether the determined candidate sequences of parts to be processed will be delivered on time using Little's Law (step 506). For example, the system can apply the techniques described above with reference to steps 308 and 310 of FIG. 3.

Figure 6:
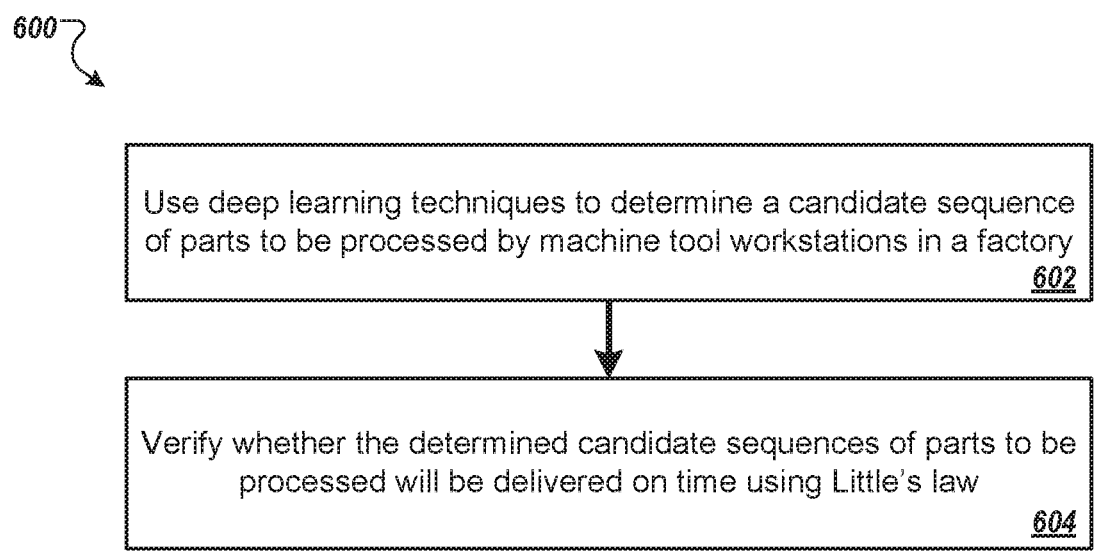
FIG. 6 is a flowchart of a second example process for verifying whether sequences of parts to be processed by multiple machine tool workstations will be delivered on time.

FIG. 6 presents a second example process 600 for verifying whether sequences of parts to be processed by multiple machine tool workstations will be delivered on time. For example, the process 600 may be performed by one or more processors included in a processing system such as the system 200 described with reference to FIG. 2 above. The example process 600 can be performed in conjunction with and/or using some or all of the techniques described above with reference to example process 300 of FIG. 3.

The system uses deep learning techniques to determine, for a factory including multiple machine tool workstations, a candidate sequence of parts to be processed by the machine tool workstations (step 602). The candidate sequence of parts includes a sequence of parts that, when processed by the multiple machine tool workstations, reduces overall machine tool workstation setup time. For example, the system can apply the deep learning techniques described above with reference to steps 304 and 306 of FIG. 3 and in the additional details described below.

The system verifies whether the determined candidate sequences of parts to be processed will be delivered on time using Little's Law (step 604). For example, the system can apply the techniques described above with reference to steps 308 and 310 of FIG. 3.

The following provides additional details for processing multiple parts using multiple machine tool workstations in a factory, such as the processes 300, 500 and 600 described above with relation to FIGS. 3, 5 and 6 as output by the system 100.

Divide and Conquer

The following provides a discussion of the benefits of dividing the factory into specific functional groups and applying machine learning techniques.

In the present disclosure, the Job Shop scheduling problem need not be solved for a whole factory of N part numbers and M machines which would require the evaluation of $(N!)^M$ sequences of part numbers. Instead, the factory is split into multiple functional groups, as described above with reference to step 302 of FIG. 3. Each functional group can be constrained to have a fixed number of jobs, e.g., 50-100 different jobs. The deep learning training of the neural network as described with reference to step 304 of FIG. 3 can be accomplished using several thousand solutions of the branch and bound method to the following problem: Given a number x of different jobs, e.g., 100 different jobs, at an AI Pull Group, find the sequence of a number y of jobs, e.g., 4 jobs, that result in the lowest total setup time. This amounts to finding the lowest setup sequence among the $x!/((x-y)!y!)$, e.g., $100!/(96!4!)=3.9$ million sequences. This assumes that the order of the four jobs selected is irrelevant to the resulting total setup time. If this is not the case the lowest setup time sequence among the $x!/y!$ sequences must be identified—a problem $(x-y)!$ factor larger. This can reduce the computation time of a trained neural network to a few minutes at most, a task that otherwise would be complex and infeasible even for a supercomputer directly solving the branch and bound problem. The future speed of the process may be enhanced by the availability of 5G internet connection which is two orders of magnitude faster than 4G, with 6G just over the horizon. Quantum computing may offer an increase of more than 100 fold in the next few years.

As described above with reference to step 302 of FIG. 3, division of the factory can be accomplished by its division into AI Pull Groups, e.g., by putting a common generic Kanban in front of each functional department of like machines, e.g. all the mills, all the lathes, all of the drills, etc. In a Pull Group, when a job is completed and the number of jobs falls below a maximum, a signal can be generated electronically which allows work from upstream sources to be "pulled" into the (Pull Group) Kanban. A generic Pull Group only allows a cap of not more than, say, 10 days of WIP to enter each Pull Group Kanban. The amount of time can be determined by the average setup and machining time per job and can be 2 jobs per machine. This can amount to 50-100 jobs. By dividing the number of jobs in WIP and keeping track of the average exit rate of jobs per day finished at each functional department, the delay time at each Pull Group down the route of each job is known by using Little's Law.

By summing up all the delay times at each Pull Group on a job's router, Little's Law provides the average cycle time through the process. This allows the verification that the 4 jobs selected at an AI Pull Group can be run in sequence and still meet customer on-time delivery. The lead time of the remaining 96 jobs at a Pull Group can be tested to make sure no jobs are left behind that might fail to meet customer delivery date. The chaotic machine to machine flow of FIG. 1 is replaced with a fixed flow from machine to a next AI Pull Group on the job router. Thus the location of every job, and through Little's Law whether its schedule meets the delay time, is known.

The Lean Six Sigma Pull System

The following provides a discussion of the known Kanban system of pull scheduling.

In pull scheduling, no new job can be released into a process until one job of equivalent production time exits the process. No more than two jobs per machine or their equivalent are released into the common Pull group Kanban. For LB lathes, two jobs amounts to less than ten days' worth of work. When a machine is about to complete a job, up to four new jobs for that machine must be selected. If they were a perfect match, the setup time would be reduced by greater than or equal to 75%. For example, based on actual sensor data, suppose a number of jobs not on machines at an LB pull group is between 1 and 8. There may be ~50 jobs that are destined for the LB Pull Group and are just one step prior in their router, i.e., they will arrive in less than a week. Therefore the maximum delay at any Pull Group is five days. Since the average part number progresses through three different machines before it is completed, this equates to a 15 day worst case cycle time. The techniques described in this specification can reduce setup time by running a sequence of jobs of similar geometry and tooling which has the minimum total setup time.

All of these 50-100 part numbers are good candidates because they can all be shipped to customers within a month or else they would not have been "Pulled" in the first place. Each part number takes about two days to machine, and it is not practical to sequence more than 4 at once as it ties up the machine too long and reduces flexibility to respond to unanticipated customer needs. Sequences within 50 part numbers of length 4 at a time are examined. So referring to the number of sequences with M=1 machine, and N=50 part numbers with length 4 at a time, the number of sequences $\{S\}$ which must evaluated is $\{S\}=(N!)^M$ in groups of 4 part numbers $$= \left( \frac{50!}{4! \, 46!} \right) = 230{,}000$$

possible Sequences.

The Traveling Salesman Problem and the Branch and Bound Method

The following provides a description of the travelling salesman problem and branch and bound method in relation to the Job Shop manufacturing problem.

Continuing the example above, there are 230,000 sequences that need to be checked to see which will yield the minimum setup time while still finishing all 4 part numbers in time to still meet customer schedule. This task is similar to the traveling salesman problem: Given a list of cities and the distances between each pair of cities, what is the shortest possible route that visits each city and returns to the origin city?

One example technique that could be applied is the nearest neighbor technique where a subsequent part number is selected as being the one whose setup tooling is closest to the part number that is about to finish, however this technique seldom results in achieving minimum setup time.

In the present disclosure, the four part numbers that can be run in a sequence and have the lowest total setup time while still being completed in time to meet customer schedule without the constraint of returning to the original tool set are to be found. The reason why the nearest neighbor approach usually does not produce the minimum setup is that the first part number which is the nearest neighbor to the machine about to run out of work may not result in the minimum total setup time for four part numbers. There may be a non-nearest neighbor that may be in a cluster of three others that have near-identical tooling that will yield a lower total setup time. Nearest neighbor is myopic: it can only look ahead one job at a time. The neural network is, by contrast, far sighted, and can evaluate all 230,000 sequences based on its branch and bound training.

Figure 7:
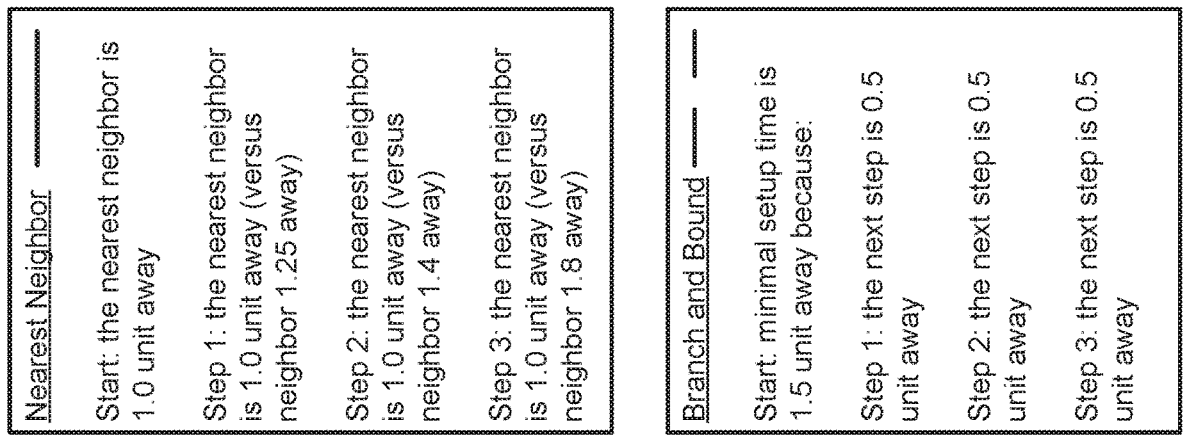
FIG. 7 illustrates a comparison of a nearest neighbor approach and a branch and bound approach
Figure 7:
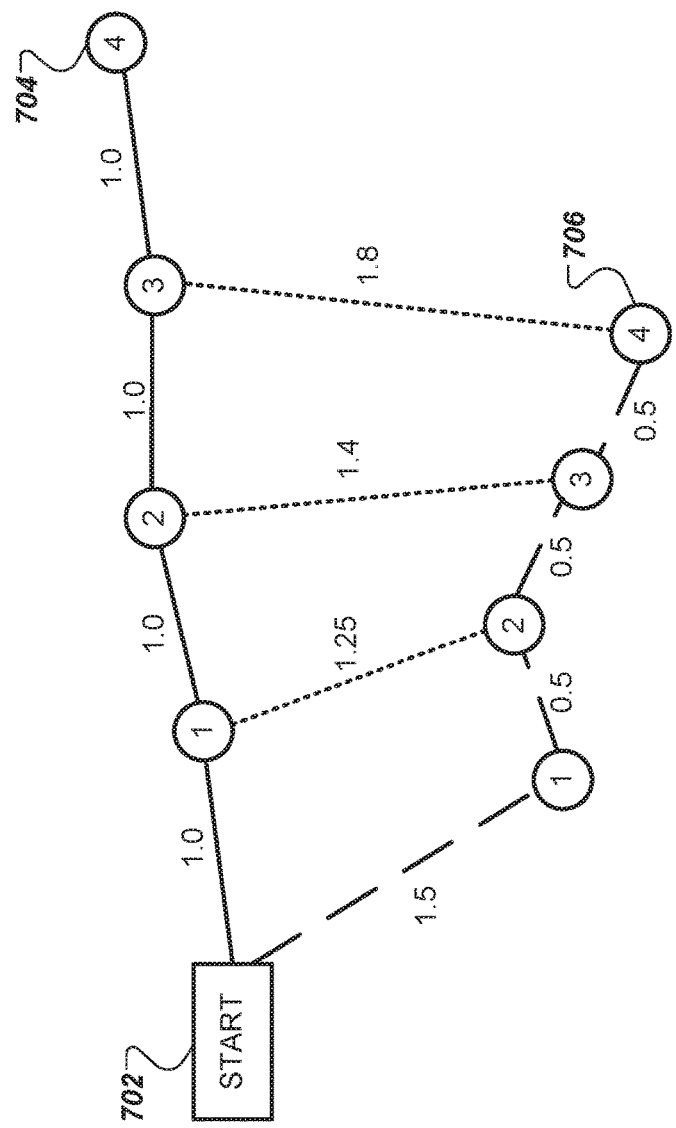

FIG. 7 illustrates a comparison of a nearest neighbor approach and a branch and bound approach. In the nearest neighbor approach, a path from the start 702 would proceed to a fourth workstation/process step 704 via the solid line. The dotted lines show path steps prohibited by nearest neighbor logic because their setup times are greater than 1.0. By comparison, the branch and bound approach takes a path from the start 702 to a fourth workstation/process step 706 via the dashed line. In contrast to the nearest neighbor approach, the branch and bound approach examines all possible paths. This means that the path might take a first step that is longer than the nearest neighbor approach, e.g., 1.5 units away instead of 1, but then is able to take steps with lower distances, e.g., 0.5 units away instead of 1, resulting in a total shorter (lower set up time) path.

While a mathematical formula to solve the problem cannot be found, an alternative approach is the branch and bound method. The branch and bound method can be used to provide a near exact solution to the problem of which four part numbers of 50 should be run in sequence to provide the minimum setup time. Results can show more than a 50% reduction in setup time with no engineering effort. However, unfortunately, the branch and bound method is computationally slow and is not practical for real time application in a factory. For example, a problem equivalent to 7,397 part numbers can require 3 years to find an optimal solution—computation time increases as roughly the cube of the number of cities in the travelling salesman problem.

Instead, in the present disclosure all 1000 part numbers are not processed at once. Rather, the factory is subdivided into particular logical pull groups, and typically only 50-100 part numbers are processed at once. Thousands of training examples of 50 part numbers can be solved by branch and bound, e.g., in the Cloud, in a much shorter time, e.g., in a few hours. This is too slow for shop floor application but adequate for offline use in training to solve a large sample of 50-100 part number problems that have actually occurred.

These examples can be used to train a neural network which can instantly solve a new problem due to the library of training examples, and hence is suitable for the ever-changing shop floor application. It is possible to wait until a given machine tool is within 3 hours of completing its job. The neural network then examines the ~50 jobs in the AI Pull Group and selects the four jobs which result in the lowest setup time. The neural network then verifies on time delivery of these four jobs based on their local completion date plus the sum of lead time delays down their router using Little's Law.

Neural Networks and Machine Learning

The following provides an overview of neural networks and machine learning.

Machine learning has been described as "the field of study that gives computers the ability to learn without being explicitly programmed," where "a computer program is said to learn from experience E with respect to some class of tasks T and performance measure P, if its performance at tasks in T, as measured by P, improves with experience E."

The brain can cause a variety of tasks to be performed: drive a car, learn calculus, eat food, walk, etc. To perform each of these different tasks using a traditional computer architecture would require a different specialized program for each task. In contrast, the brain includes a single "learning" program. The brain performs particular functions, e.g., seeing and hearing, without any specialized program specific to seeing or hearing. Rather it is trained by experiences from the past, and uses failures and successes to learn how to react to new experiences.

In the present disclosure, new groups of a predetermined number of part numbers, e.g., 50 part numbers, will lead to new groups of fewer part numbers, e.g., 4 part numbers, that minimize setup time. The sequencing problem is solved by a particular grouping of machine tool workstations, as described above with reference to, e.g., step 302 of FIG. 3, and a particular machine learning training process—not a mathematically programmed computation—as described above with reference to, e.g., step 304 of FIG. 3. Training examples are provided by offline examples computed by a branch and bound method.

A neural network can be considered as a computerized version of neurons in the brain with are effectively binary switches which use inputs and stored data and calculations to drive an output signal. A neuron in the brain is a computational element that has dendrites that receive several inputs. The neuron does some computations, then decides whether or not to send or inhibit an electrical signal down the axon to the dendrite of another neuron which will then perform a computation and may decide to send another signal out, or not send a signal.

In an artificial neural network several inputs (dendrites) are connected to a computation unit which sends or inhibits an output signal to one or more other artificial neurons. Several artificial neurons can be connected in an artificial neural network. In the present disclosure, given a set of inputs that correspond to part numbers, a predetermined number of part numbers, e.g., 4 part numbers, which have the lowest total setup time when they are produced by a machine tool workstation with a given toolset that is nearly out of work are sought. The neural network measures the total setup time of each iteration, determines whether the total setup time has increased or decreased for each choice of 4 potential part numbers, and effectively measures the slope between iterations. This is known as gradient descent, and in the present disclosure a minimum setup time is sought. Other measures of performance could equally be used and the choice is dependent on the particular application of the disclosed techniques.

This feedback process is known as back propagation. Mathematically, back propagation is an application of the chain rule of partial derivatives of elementary calculus. A neural network with three or more hidden layers is known as deep learning, which is thus a subset of the general term machine learning. The power of deep learning is the automatic feature extraction of deciding which characteristics of a data set can be used as indicators to label the data reliably. Prior to deep learning, machine learning professionals often spent many months of feature extraction. In the present disclosure, deep learning determines whether a job on the AI Pull Group is a good or bad potential match with an existing machine setup. As a non-limiting example, this can be accomplished with a three hidden layer neural network. One drawback of deep neural networks is that their accuracy increases with an increased number of training examples, therefore to train an accurate deep neural network many training examples are required.

In the present disclosure, when training a neural network by processing a training example, an output can be compared to a correct branch and bound solution to a specific toolset of a single machine that is about to run out of work. Therefore of the total number of possible sequences $(N!)^M$ of N part numbers on M machines, the presently described problem sets M as equal to a fixed number, e.g., M=1, which can greatly reduce the number of possible sequences. The WIP is then divided by like machine Pull Groups which typically have about N=50 different part numbers instead of 1000. These branch and bound training examples take approximately a few hours to compute the optimal sequence offline, e.g., in the Cloud, and can be programmed to run 24 hours per day, or 1500 in a month. Therefore, for 50 part numbers matched against one tool set of 20 parameters, the neural network can attempt to solve for the lowest setup time solution. If the neural network answer is incorrect, the neural network weights on each neuron input are adjusted to give the near-correct answer. After many, e.g., a few thousand, training examples, the neural network can close in on a solution in a few minutes at most with an answer that is near optimal, e.g., is within 90% of optimal.

Figure 8:
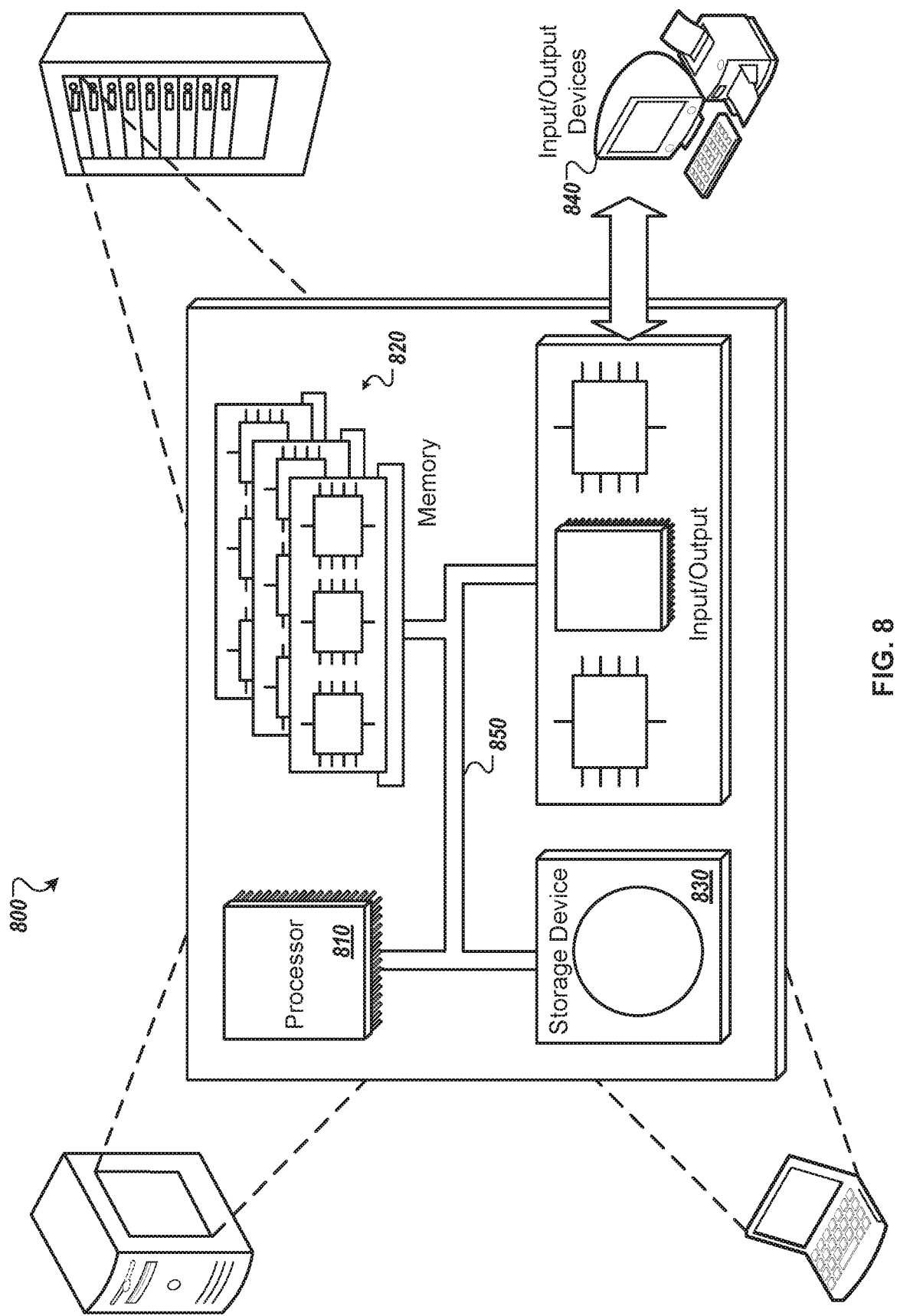
FIG. 8 is a schematic diagram of an exemplary system.

FIG. 8 is a schematic diagram of a generic computer system 800. The system 800 can be used for the operations described in association with any of the computer-implement methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described in this specification can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the below claims.

The invention claimed is:

1. A method for processing a plurality of parts using a plurality of machine tool workstations, the method comprising:
grouping the plurality of machine tool workstations into multiple functional groups, wherein each functional group includes workstations of the same type;
for each of the multiple functional groups:
training a neural network to process a data input representing multiple parts to be processed by the type of workstations included in the functional group and generate a data output representing a sequence of ordered subsets of the multiple parts that, when processed by the functional group, produces a reduced set up time for the workstations in the functional group;
processing, through the trained neural network, data representing a collection of the plurality of parts, the collection of the plurality of parts comprising parts to be processed by the type of workstations included in the functional group, to generate a corresponding sequence of ordered subsets of the collection of the plurality of parts that, when processed by the functional group, produces the reduced set up time for the workstations in the functional group;
computing an average delay time associated with the generated sequence of ordered subsets of the collection of the plurality of parts;
determining whether the average delay time is less than a predetermined threshold; and
in response to determining that the average delay time is less than the predetermined threshold, releasing one or more parts according to the generated sequence of ordered subsets of the collection of the plurality of parts to the functional group for processing.

2. The method of claim 1, wherein the plurality of machine tool workstations comprise one or more of (i) cutting tools, (ii) drilling machines, (iii) lathes, (iv) boring machines, or (v) grinding machines.

3. The method of claim 1, wherein each workstation is associated with a set of performance parameters, the set comprising workstation setup time and part delivery time.

4. The method of claim 1, wherein workstations of a same type comprise workstations with a common Kanban inventory.

5. The method of claim 1, wherein each functional group is configured to receive a constrained number of days of work in progress per batch of parts, wherein the number of days depends on an average setup and machining time per part over each workstation in the functional group.

6. The method of claim 5, wherein a quantity of multiple functional groups is dependent on the computational capabilities of the neural networks and properties of the plurality of machine tool workstations.

7. The method of claim 6, wherein properties of the plurality of machine tool workstations comprise one or more of (i) location of machine tool workstation, (ii) an acceptable uninterrupted machine tool workstation runtime.

8. The method of claim 1, wherein, for each of the multiple functional groups, training the neural network comprises training the neural network on a plurality of training data sets, each training data set comprising the data input representing the multiple parts to be processed by the type of workstations included in the functional group and the corresponding sequence of ordered subsets of the multiple parts that, when processed by the functional group, produces the reduced set up time for the workstations in the functional group, wherein the corresponding sequence of ordered subsets of the multiple parts has been determined using a branch and bound method.

9. The method of claim 8, wherein training the neural network on the plurality of training data sets comprises, for each training data set:
  processing the data input representing multiple parts in accordance with current values of parameters of the neural network to generate the predicted sequence of ordered subsets of the multiple parts; and
  adjusting the current values of the parameters of the neural network based on the predicted sequence of ordered subsets of the multiple parts and the sequence of ordered subsets of the multiple parts determined using the branch and bound method.

10. The method of claim 1, wherein the neural network is implemented by cloud computing.

11. The method of claim 1, wherein a size of the sequence of ordered subsets is dependent on acceptable uninterrupted machine tool workstation runtimes.

12. The method of claim 1, wherein releasing parts according to the generated sequence of ordered subsets of the collection of the plurality of parts to the functional group for processing generates processed parts, and wherein the method further comprises routing one or more subsets of the processed parts to other functional groups for further processing.

13. The method of claim 1, wherein determining the average delay time comprises applying Little's Law.

14. The method of claim 1, wherein determining whether the average delay time is less than the predetermined threshold comprises: computing a standard deviation of delay time; adding a multiple of the computed standard deviation to the computed average delay time to generate an adjusted average delay time; and determining whether the adjusted average delay time is less than the predetermined threshold.

15. The method of claim 1, further comprising, in response to determining that the average delay time exceeds the predetermined threshold: iteratively reducing a size of the ordered subsets in the generated sequence of ordered subsets until the average delay time is less than the predetermined threshold.

16. The method of claim 15, wherein a size of the ordered subsets is equal to one, and wherein the method further comprises releasing a random sequence of parts to next available machine tool workstations.

17. A system comprising:
  a collection of machine tool workstations used to process a plurality of parts; one or more computers in data communication with the collection of machine tool workstations;
  a computer-readable medium coupled to the one or more computers having instructions stored thereon which, when executed by the one or more computers, cause the one or more computers to perform operations comprising:
    grouping the plurality of machine tool workstations into multiple functional groups, wherein each functional group includes workstations of the same type;
    for each of the multiple functional groups:
      training a neural network to process a data input representing multiple parts to be processed by the type of workstations included in the functional group and generate a data output representing a sequence of ordered subsets of the multiple parts that, when processed by the functional group, produces a reduced set up time for the workstations in the functional group;
      processing, through the trained neural network, data representing a collection of the plurality of parts, the collection of the plurality of parts comprising parts to be processed by the type of workstations included in the functional group, to generate a corresponding sequence of ordered subsets of the collection of the plurality of parts that, when processed by the functional group, produces the reduced set up time for the workstations in the functional group;
      computing an average delay time associated with the generated sequence of ordered subsets of the collection of the plurality of parts;
      determining whether the average delay time is less than a predetermined threshold; and
      in response to determining that the average delay time is less than the predetermined threshold, releasing one or more parts according to the generated sequence of ordered subsets of the collection of the plurality of parts to the functional group for processing.

* * * * *